United States Patent [19]

Roelandse et al.

[11] Patent Number: 4,856,039
[45] Date of Patent: Aug. 8, 1989

[54] X-RAY TUBE HAVING A ROTARY ANODE WITH RHENIUM-CONTAINING BEARING SURFACES FOR A GALLIUM-ALLOY LUBRICANT

[75] Inventors: Cornelius D. Roelandse; Pieter Hokkeling, both of Eindhoven, Netherlands

[73] Assignee: U.S. Philips Corporation, New York, N.Y.

[21] Appl. No.: 57,580

[22] Filed: Jun. 2, 1987

[30] Foreign Application Priority Data

Jun. 2, 1986 [NL] Netherlands ................. 8601414

[51] Int. Cl.⁴ .......................................... H01J 35/10
[52] U.S. Cl. ..................................... 378/133; 378/132
[58] Field of Search ................... 378/132, 133, 144

[56] References Cited

U.S. PATENT DOCUMENTS

| | | | |
|---|---|---|---|
| 3,694,685 | 9/1972 | Houston | 378/130 |
| 4,210,371 | 7/1980 | Gerkema et al. | 378/133 |
| 4,276,493 | 6/1981 | Srinivasa et al. | 378/144 |
| 4,413,356 | 11/1983 | Harrl | 378/132 |
| 4,468,800 | 8/1984 | Friedal et al. | 378/131 |
| 4,481,655 | 11/1984 | Annis et al. | 378/144 |
| 4,562,587 | 12/1985 | Gerkema et al. | 378/133 |
| 4,641,332 | 2/1987 | Gerkema | 378/132 |

*Primary Examiner*—Craig E. Church
*Assistant Examiner*—John C. Freeman
*Attorney, Agent, or Firm*—Brian Wieghaus

[57] ABSTRACT

The invention relates to an X-ray tube having a rotary anode which is rotatably supported in a vacuum-tight housing by at least one metal-lubricated sliding bearing of which at least the cooperating bearing surfaces consist of a W-alloy and in which the lubricant is Ga or a Ga-alloy.

In order to extend the life of the X-ray tube, in particular at operating temperatures of the bearing above 400° C., a mechanically readily machinable W-alloy is used which comprises from 2 to 27% by weight of Re.

4 Claims, 1 Drawing Sheet

U.S. Patent
Aug. 8, 1989
4,856,039
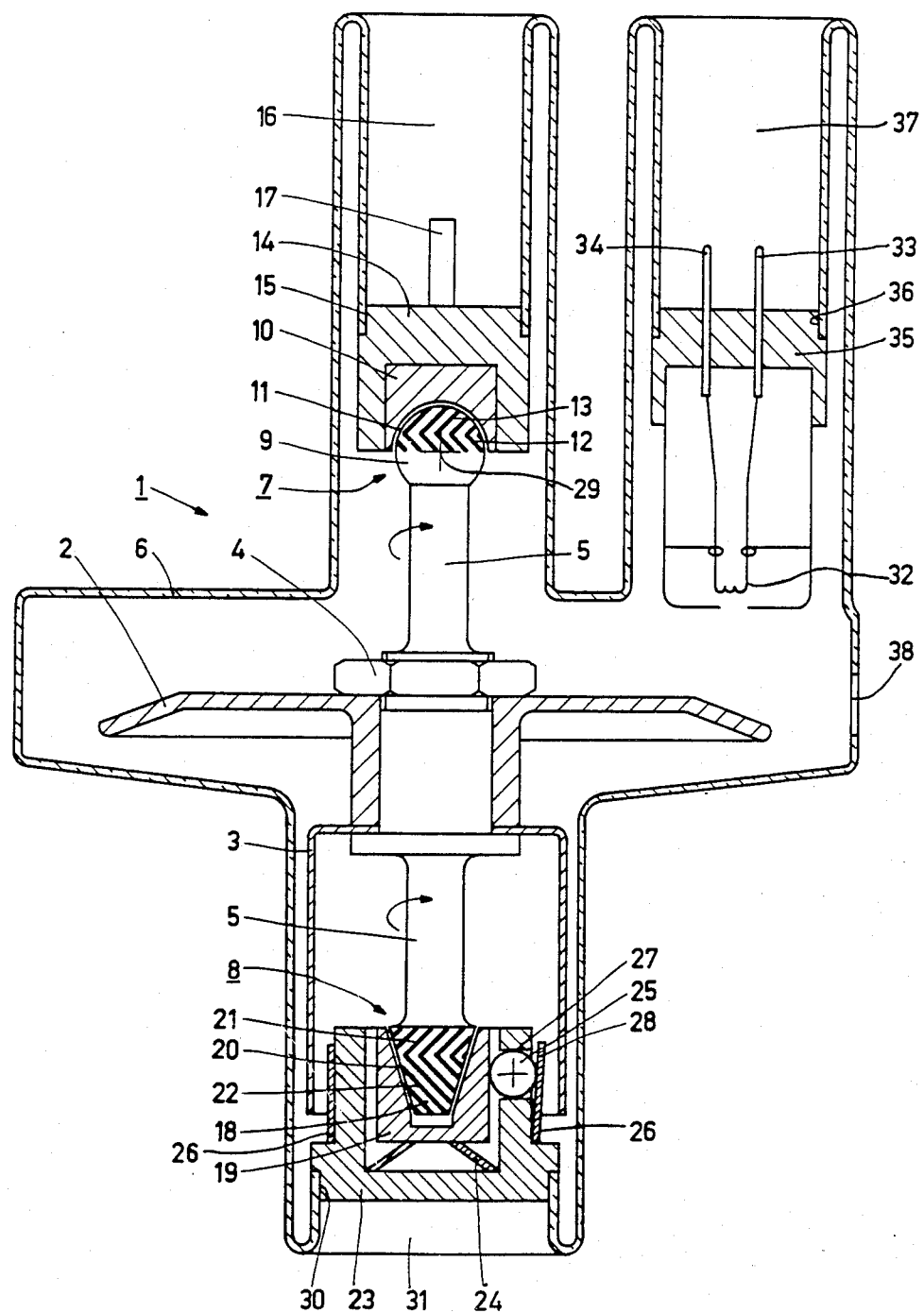

X-RAY TUBE HAVING A ROTARY ANODE WITH RHENIUM-CONTAINING BEARING SURFACES FOR A GALLIUM-ALLOY LUBRICANT

BACKGROUND OF THE INVENTION

The invention relates to an X-ray having a rotary anode which is rotatably supported in a vacuum-tight housing by at least one metal-lubricated sliding bearing of which at least the cooperating bearing surfaces consist of a W-alloy and in which the lubricant is Ga or a Ga-alloy.

An X-ray tube of this type is particularly suitable as a source of radiation in medical diagnostic applications.

U.S. Pat. No. 4,210,371 describes such an X-ray tube in which a lubricant is used which consists of Ga and which furthermore, not counting impurities, may comprise In and/or Sn, which lubricant effectively wets the bearing surfaces. "Effective wetting" means that there is a wetting contact in which there exists a direct interaction between the metal atoms of the bearing surfaces and the atoms of the Ga or of the Ga-alloy, that is to say without an intermediate layer of, for eample, an oxide. The bearing surfaces preferably consist of W or Mo or of an alloy of W and Mo. Mo is preferably used because this can be machined more easily than W, due to the brittleness of W. When Mo is used the problem occurs that when the operating temperature of the bearing of the X-ray tube is above 400° C. the bearing surfaces are attacked by the lubricant in which in particular the Ga present in aggressive and, for example, can form alloys with Mo. As a result of the formation of intermetallic compounds on the interface of the bearing surfaces and the lubricants the bearing may become clogged, which adversely influences the life of the X-ray tube.

SUMMARY OF THE INVENTION

It is an object of the invention to provide an X-ray tube having a rotary anode in which the formation of crystalline intermetallic compounds with the lubricant of the sliding bearing is suppressed or inhibited so as further to extend the life of the X-ray tube.

A particular object of the invention is to provide an X-ray tube having a rotry anode which can be used at operating temperatures of the bearing above 400° C., preferably up to 800° C.

A further object of the invention is to provide an X-ray tube having a rotary anode in hich a mechanically readily machinable material is used for the cooperating bearing surface of the bearing.

According to the invention these objects are achieved by means of an X-ray tube as described in the opening paragraphs and which is characterized in that the W alloy consists for at least 99% by weight of W and Re, in which the quantity of Re is 2 to 27% by weight. Moreover, the W alloy may still comprise up to a collective quantity of 1% by weight of usually present impurities or usual additives such as Ta, Nb and/or Mo. The quantity of Re is at least 2% by weight in order that the alloy is sufficiently less brittle than W to obtain a readily machinable material. The quantity of Re is at most 27% by weight because in the case of larger quantities of Re a phase separation occurs and because of the hardness of the material with such quantities of Re becomes undesirably large.

Although U.S. Pat. No. 3,694,685 describes an X-ray tube having a rotary anode in which liquid metal which may comprise, for example, Ga is used as a cooling agent and in which inter alia W and Re are mentioned as suitable materials which are not attacked by Ga at temperatures up to approximately 400° C., there are no indications that alloys of W with 2 to 27% by weight of Re are useful at temperatures up to approximately 800° C. Although U.S. Pat. No. 4,468,800 describes an X-ray tube having a rotary anode in which an alloy of W with Re is used as a target layer of the anode, this target layer does not come in contact with the lubricant of the bearing so that the resistance of the W-Re alloy to Ga is of no significance.

A particularly readily machinable material having a great resistance to Ga and Ga-alloys is obtained according to the invention when the W alloys comprises from 5 to 10% by weight of Re.

A preferred embodiment of an X-ray tube according to the invention is characterized in that at least one of the cooperating bearing surfaces of the sliding bearing comprises spiral grooves. By means of these spiral grooves liquid lubricant is urged into the bearing during the operation, as a result of which a better distribution of the alloy in the bearing occurs.

BRIEF DESCRIPTION OF THE DRAWING

The invention will now be described in greater detail with reference to a drawing the sole FIGURE of which is a diagrammatic longitudinal sectional view of a rotary anode X-ray tube according to the invention.

DETAILED DESCRIPTION OF THE PREFERRED EMBODIMENTS

The FIGURE shows an X-ray tube 1 having a rotary anode 2 which, together with a rotor 3, is secured by a nut 4 on a shaft 5 which is rotatably supported in a vaccum-tight housing 6 by two bearings 7 and 8.

The bearing 7 consists of a spherical part 9 which is rigidly connected to the shaft 5 and which is seated in a part-spherical cavity in a supporting member 10. The surfaces of the spherical part 9 and the supporting member 10 which face one another constitute the cooperating beaaring surface of the bearing 7 and bound a bearing gap 11. The bearing gap 11 is filled with a Ga-alloy which serves as a lubricant and effectively wets the bearing surfaces of the bearing parts 9 and 10 which are manufactured from W with 5% by weight of Re. The Ga-alloy consists, for example, of 62% by weight of Ga, 25% by weight of In and 13% by weight of Sn. The wetting is so good that the bearing surfaces, under load, are completely separated from each other in the tube. The spherical part 9 comprises a pattern of grooves 12 which upon rotation of the shaft 5 urge the lubricant to that part of the spherical part 9 which is farthest remote from the bearing 8. The spherical part 9 furthermore comprises a second pattern of grooves 13, the grooves of which extend oppositely to those of the pattern of grooves 12 and hence urge the lubricant in the opposite direction. As a result of these patterns of grooves 12, 13 the bearing 7, upon rotation of the shaft 5, has a great dynamic stability in addition to an extra large load-bearing capacity in the radial and axial directions. The supporting member 10 is mounted in a cylindrical body part 14 which is fixed in a tubular re-entrant portion 16 of the housing 6 by means of a vacuum-tight seal 15. The body part 14 comprises a contact pin 17 for the supply of the tube current and for the dissipation of a part of the thermal energy which is generated in the anode during operation.

The bearing 8 consists of a frusto-conical part 18 which is rigidly connected to the shaft 5 and which is seated in a frusto-conical cavity in a supporting member 19. The surfaces of the frusto-conical part 18 and the supporting member 19 which face one another constitute the cooperating bearing surfaces of the bearing 8 and bound a bearing cap 20. The bearing gap 20 is filled with a Ga-alloy which serves as a lubricant and which effectively wets the bearing surfaces of the bearing parts 18 and 19 manufactured from a W-Re-alloy (8% by weight of Re). This wetting is so good that said surfaces, under load, are completely separated from each other in the tube. The frust-conical part 18, like the spherical part 9, comprises two patterns of grooves 21 and 22 which urge the lubricant in opposite directions into the bearing gap 20.

The supporting member 19 is mounted in a cylindrical body 23 and is resiliently supported therein in the axial direction by means of a cup spring 24 and in the radial direction by means of three steel balls 25 (only one can be seen in the drawing) and a resilient element 26. The balls 25 are movably mounted in cylindrical apertures 27 in the body 23 and are pressed against the supporting member 19 in the radial direction by means of resilient lugs 28 which are connected to the resilient element 26. The resilience of the support in the axial direction provided by the cup spring 24 serves to compensate for variations in the length of the shaft 5 as a result of varying temperatures in the tube. The resilience of the support in the radial direction provided by the resilient element 26 ensures that in the case of unbalance of the rotary anode 2, to prevent extra forces on the bearings the shaft 5 can perform a precessional movement over a conical surface of the apex of which is at the geometrical centre 29 of the spherical part 9 of the bearing 7. The body 23 is fixed in a tubular reentrant position 31 of the housing 6 by means of a vacuum-tight seal 30.

A cathode 32 shown diagrammatically is connected electrically to two contact pins 33 and 34 which are mounted in a body 35 which is fixed in a tubular reentrant portion 37 of the housing 6 by means of a vacuum-tight seal 36. The cathode glow voltage is applied between the contact pins 33 and 34 while the tube current is dissipated via one of the said pins. Generated X-ray radiation can leave the tube through the window 38.

The use of the invention is not restricted to the embodiment as described hereinbefore but is also possible in the X-ray tubes of a different type, for example, in X-ray tubes having a single-bearing rotary anode, for example, a rotary anode supported by a single-bearing with cylindrical bearing surfaces.

What is claimed is:

1. In an X-ray tube having a vacuum-tight housing, a rotary anode, a bearing having a first bearing surface on said rotary anode and a second bearing surface in said housing cooperating with said first bearing surface for rotatably supporting said rotary anode in said housing, and a lubricant disposed between said bearing surfaces comprising Ga for effectively wetting said bearing surfaces and lubricating said bearing, wherein the improvement comprises:

said first and second bearing surfaces consisting of an W-alloy having at least 99% by weight of W and Re, and in which the quantity of Re is between 2% and 27% by weight.

2. An X-ray tube as claimed in claim 1, characterized in that the W-alloy comprises from 5 to 10% by weight of Re.

3. An X-ray tube as claimed in claim 2, characterized in that at least one of the cooperating bearing surfaces of the sliding bearing comprises a pattern of spiral grooves for urging said lubricant into said bearing from opposite directions during bearing operation for rotation of said rotary anode.

4. An X-ray as claimed in claim 1, characterized in that at least one of the cooperating bearing surfaces of the sliding bearing comprises a pattern of spiral grooves for urging said lubricant into said bearing from opposite directions during bearing operation for rotation of said rotary anode.

* * * * *